(12) United States Patent
Tengler et al.

(10) Patent No.: US 7,439,853 B2
(45) Date of Patent: Oct. 21, 2008

(54) SYSTEM AND METHOD FOR DETERMINING TRAFFIC CONDITIONS

(75) Inventors: Steve Tengler, Grosse Pointe Park, MI (US); Ron Heft, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 185 days.

(21) Appl. No.: 11/094,345

(22) Filed: Mar. 31, 2005

(65) Prior Publication Data

US 2006/0226968 A1    Oct. 12, 2006

(51) Int. Cl.
*B60Q 1/54* (2006.01)

(52) U.S. Cl. .......................... 340/466; 340/901

(58) Field of Classification Search ............... 340/466, 340/901, 905, 988; 701/117–119
See application file for complete search history.

(56) References Cited

U.S. PATENT DOCUMENTS

| | | | |
|---|---|---|---|
| 6,574,548 B2* | 6/2003 | DeKock et al. | 701/117 |
| 2005/0222755 A1 | 10/2005 | Tengler et al. | |
| 2006/0176847 A1* | 8/2006 | Chen et al. | 370/328 |

\* cited by examiner

*Primary Examiner*—George A Bugg
*Assistant Examiner*—Shirley Lu
(74) *Attorney, Agent, or Firm*—Foley & Lardner LLP (57) ABSTRACT

A system and method for determining a traffic condition of a vehicle includes receiving status information of a plurality of vehicles, the status information including at least a speed of the respective vehicle. An average speed is determined according to the speed included in the status information of a first group of vehicles among the plurality of vehicles satisfying a first condition. An indication of the determined average speed is provided to a driver of a first vehicle.

37 Claims, 4 Drawing Sheets

SYSTEM AND METHOD FOR DETERMINING TRAFFIC CONDITIONS

FIELD OF THE INVENTION

The present invention relates generally to motor vehicles and, more particularly, to a vehicle and method for determining traffic conditions ahead of a vehicle.

BACKGROUND OF THE INVENTION

To determine traffic conditions on various roads, a driver typically must listen to local traffic news on the radio or television or visit a traffic information site on the Internet. Both of these modes for determining traffic conditions have various drawbacks. First, the traffic conditions reported on the radio, television or the Internet are generally reported late, i.e., the traffic reports refer to conditions as they existed some time before the report is made. Second, the traffic conditions are often reported irregularly or only after relatively long increments of time. In addition, the traffic reports are often limited to certain roads and may not include conditions for a road that a driver intends to take. As a result, when a driver needs to make a decision about which route to take to a destination, the driver may not be able to get the traffic information or only have limited or old traffic information available to make the decision.

It would be desirable to have a system for receiving up-to-date and relevant traffic related information.

SUMMARY OF THE INVENTION

According to an aspect of the invention, a system and a method for determining a traffic condition of a vehicle includes receiving status information of a plurality of vehicles, the status information including at least a speed of the respective vehicle. An average speed is determined according to the speed included in the status information of a first group of vehicles among the plurality of vehicles satisfying a first condition. An indication of the determined average speed is provided to a driver of a first vehicle.

Further features, aspects and advantages of the present invention will become apparent from the detailed description of preferred embodiments that follows, when considered together with the accompanying figures of drawing.

DETAILED DESCRIPTION OF PREFERRED EMBODIMENTS

Wireless communication between vehicles and to and from other structures and devices can provide for a significant increase in the amount and types of information available to vehicles and drivers, as well as the potential for a variety of new applications and systems ranging from crash avoidance to Internet entertainment systems. Systems such as telephony and Dedicated Short Range Communications (DSRC) are capable of supporting wireless communication between vehicles. For example, using a DSRC system, each vehicle is capable of generating and broadcasting a "Common Message Set" (CMS), which provides each vehicle's relevant kinematical and location information such as GPS/vehicle position including longitude, latitude, and elevation, heading, velocity, vehicular dimensions, and other related information. The DSRC system can broadcast messages between vehicles using a frequency between about 5 and 6 GHz. In addition, location and speed information can be obtained independent of the DSRC system, such as through the use of forward looking radar.

The CMS message can be broadcast as the most frequent message on the control or center channel of the DSRC band, although other messages can also be broadcast over this channel. Unicast messages (i.e., single-sender speaking directly to a single-receiver for mono-to-mono exchanges) can be directed to an alternate channel, and several channels can be designated as either urgent/safety-related channels or service-providing, non-urgent channels. This type of implementation permits OEM's to send messages only to vehicles of the same manufacturer or make, and create exchanges of information between them outside the central channel of communication.

Figure 1:
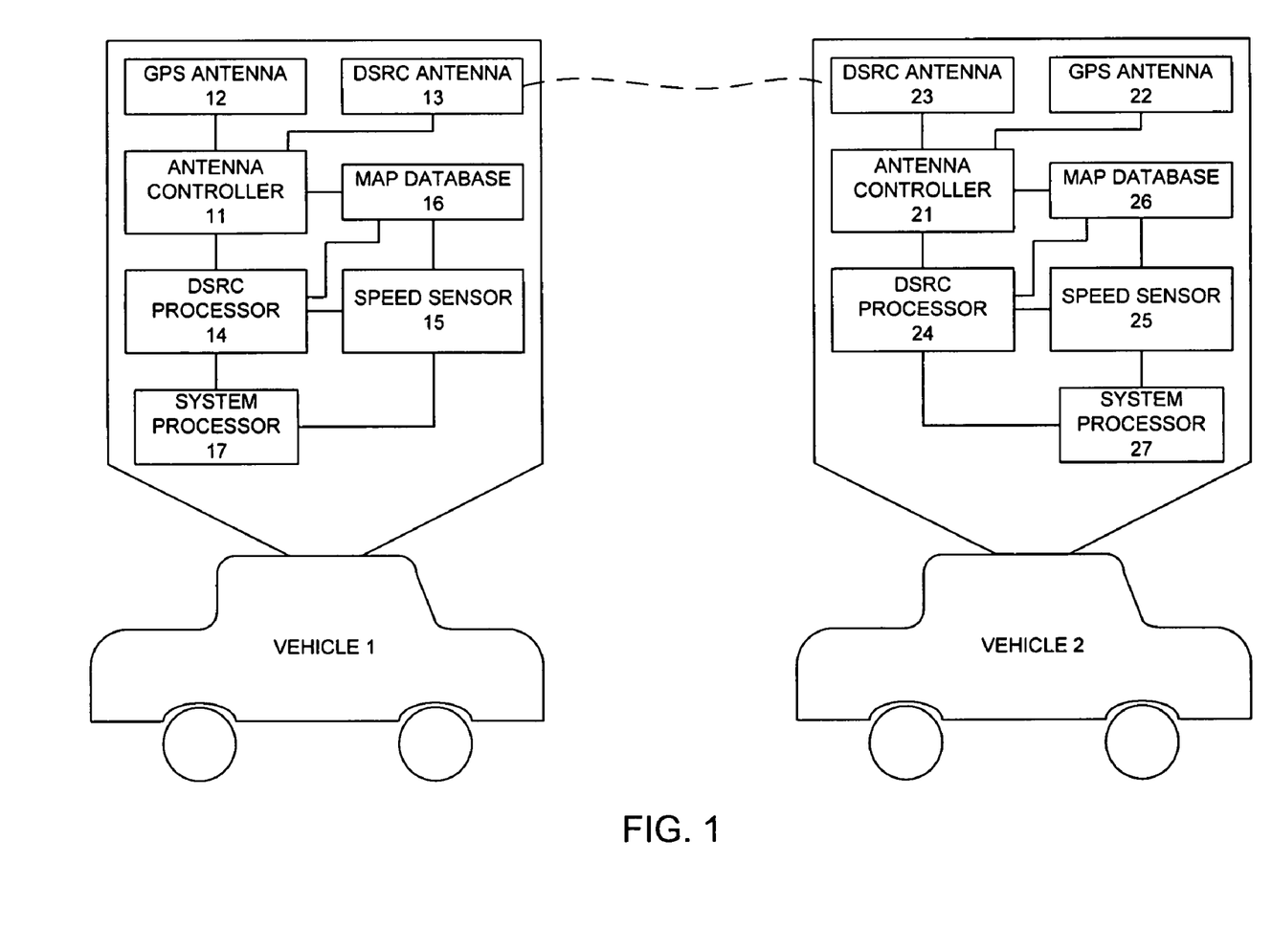
FIG. 1 is a block diagram of a traffic control system consistent with the present invention.

In view of this ability for information to be communicated between vehicles, it is possible to configure a system that enables a vehicle to modify its operation or settings and to notify a driver of settings, situations or conditions relevant to operating a vehicle. For example, it is possible for a driver to adjust a driving route based on location and speed information from other vehicles. FIG. 1 is a block diagram of a traffic control system consistent with the present invention. As shown in FIG. 1, there is a vehicle 1 and a vehicle 2. The vehicle 1 includes an antenna controller 11, a GPS antenna 12, a DSRC antenna 13, a DSRC processor 14, a speed sensor 15, a map database 16, and a system processor 17. The vehicle 2 has similar elements including an antenna controller 21, a GPS antenna 22, a DSRC antenna 23, a DSRC processor 24, a speed sensor 25, a map database 26, and a system processor 27. Although only the two vehicles 1 and 2 are shown, it should be understood that the traffic control system is applicable to more than two vehicles.

The antenna controller 11 controls the functioning of both the GPS antenna 12 and the DSRC antenna 13. The GPS antenna 12 is configured to receive information regarding the location of the vehicle 1. The DSRC antenna 13 is configured to receive information from other vehicles and devices and to transmit information from the vehicle 1. The received information and the transmitted information can include, for example, kinematical and location information such as GPS/vehicle position, heading, velocity, and vehicular dimensions, as well as status information, such as headlight status (ON/OFF, high brights, etc.), cruise control (ON/OFF) and other settable functions of a vehicle. The vehicle position, based on the GPS, preferably includes a longitude and latitude position, as well as the elevation of the vehicle. The information can be transmitted and received in a predetermined message format such as the CMS. The predetermined message format may be unique to each manufacturer or be a common format for all vehicles. Even in the common format, the predetermined message may include a section or component identifying the manufacturer, which can enable a vehicle to send a message exclusively to other vehicles of the same manufacturer or make.

To transmit a message or other information, the DSRC antenna 13 receives control instructions from the antenna controller 11 and transmits the message in accordance with the control instructions. Messages or other information received by the GPS antenna 12 and the DSRC antenna 13 are provided to the antenna controller 11. In response to the received message, the antenna controller 11 can provide new control instructions to the GPS antenna 12 and the DSRC antenna 13 based on the content of the received message. In addition, the antenna controller provides the received message to the DSRC processor 14.

The DSRC processor 14 is configured to process messages provided from the antenna controller 11 and to generate messages to be transmitted by the DSRC antenna 13. The DSRC processor 14 is also configured to determine speed and/or traffic information based on the received messages, as well as generate messages for transmission from the DSRC antenna 13. The DSRC processor 14 can include a processing unit, such as a CPU or microprocessor, a non-volatile storage medium, such as an NVRAM or ROM, and a volatile storage medium, such as RAM. The non-volatile storage preferably includes instructions executed by the processing unit to perform the message processing and generation and other control functions, as will be described in more detail herein.

The speed sensor 15 is configured to detect the traveling speed or velocity of the vehicle 1. The speed sensor 15 can be implemented as any of a number of speed detecting sensors as are known to those skilled in the art. The speed sensor 15 generates an electrical signal indicative of the speed of the vehicle 1 and provides the signal to the DSRC processor 14, the map database 16, and the system processor 17.

The map database 16 holds data indicative of the position or location of roadways that can be traveled upon by the vehicle 1. The map database 16 can be implemented in a non-volatile memory, such as a hard disk driver (HDD), a flash memory, a DVD, etc. The map database 16 may be changeable to update for changes to the roadway or for different geographical locations. For example, the map database 16 for one country may be implemented on one DVD and on another DVD for another country. Data from the map database 16 corresponding to the location of the vehicle 1 can be included in any messages composed by the DSRC processor 14 and transmitted by the DSRC antenna 13.

The system processor 17, like the DSRC processor 14, is preferably configured to include a processing unit, a non-volatile storage medium, and a volatile storage medium, such as RAM. The system processor 17 can be configured to perform functions for the vehicle 1 that are not performed by the DSRC processor 14. The system processor 17 and the DSRC processor 14 can also be configured to work in tandem, capable of performing the same functions as each other.

The components of the vehicle 2 are implemented and operate in the same manner as the corresponding components of the vehicle 1. In particular, the antenna controller 21, the GPS antenna 22, the DSRC antenna 23, the DSRC processor 24, the speed sensor 25, the map database 26, and the system processor 27 are implemented and operate in the same manner as the antenna controller 11, the GPS antenna 12, the DSRC antenna 13, the DSRC processor 14, the speed sensor 15, the map database 16, and the system processor 17, respectively.

Figure 2:
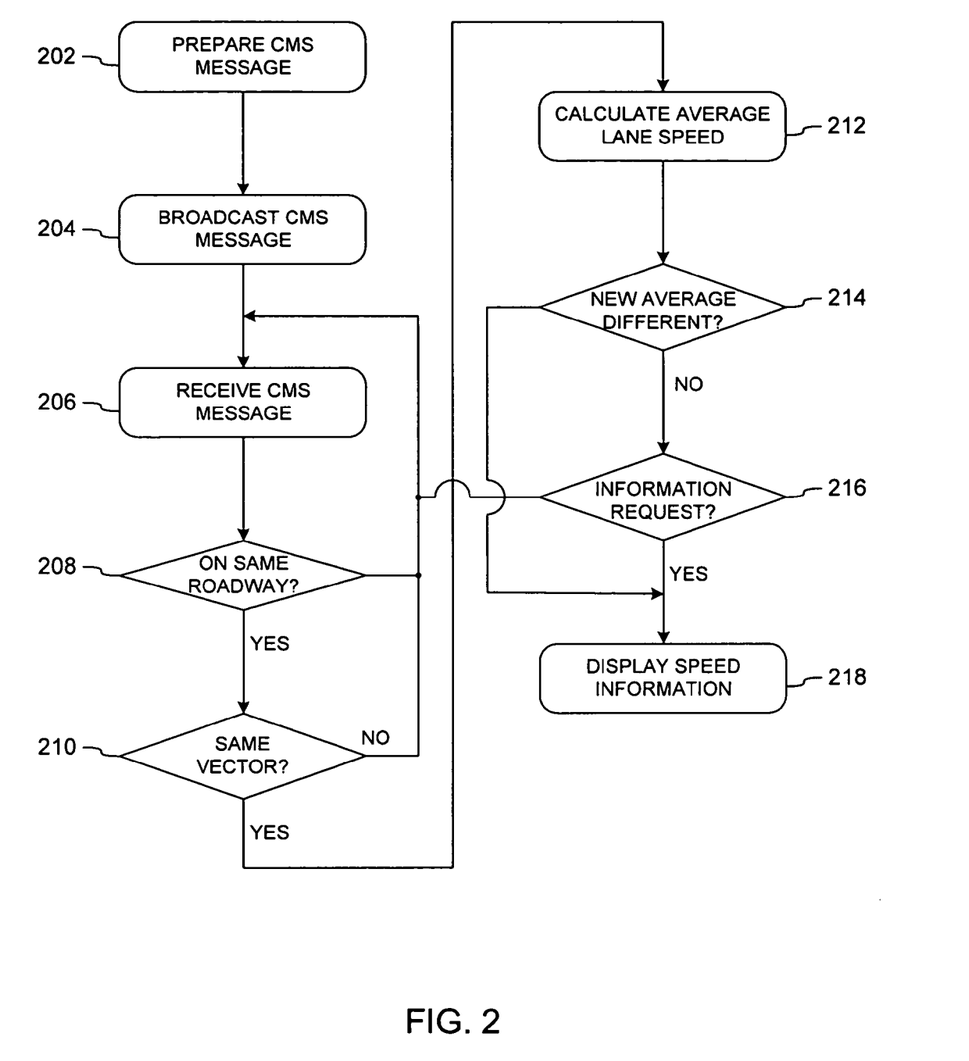
FIG. 2 is a flow diagram of a traffic control process consistent with the present invention.

FIG. 2 is a flow diagram of a traffic control process consistent with the present invention. In the following description, the process is described in conjunction with the vehicles 1 and 2 of FIG. 1. More specifically, the process is described from the standpoint of a message being transmitted to vehicle 2 and received by vehicle 1, which responds to the received message. It should be understood, however, that the process is applicable to any vehicle capable of communicating wirelessly with other vehicles.

As shown in FIG. 2, the vehicle 2 first prepares a CMS message (step 202). As described above, the CMS message can include kinematical and location information such as GPS/vehicle position (including, e.g., latitude, longitude, and elevation), heading, velocity, and vehicular dimensions, as well as other status information. With reference to FIG. 1, the DSRC processor 24 of the vehicle 2 collects the information for forming the CMS message. The information collected includes, for example, velocity data from the speed sensor 25, location information from the GPS antenna 22 and/or the map database 26, and other relevant information about the operation and settings of the vehicle 2. The collected information is formatted into the CMS message format. Although the CMS message format is preferable, other message formats, either common to all automobile manufacturers or unique to particular manufacturers can be used instead. Further, in addition to the collected information, the message is formatted to include a unique identifier for the vehicle 2 so that other vehicles receiving the message can distinguish the origin of the message from messages received from other vehicles. The CMS message can be prepared at predetermined time intervals, such as every minute.

The vehicle 2 broadcasts the CMS message (step 204). To broadcast the message, the DSRC processor 24 provides the CMS message to the antenna controller 21, which controls the DSRC antenna 23 to broadcast the message. The CMS message is broadcast at least to vehicles in the vicinity of the vehicle 2. Additionally, the CMS message can be broadcast to other structures, such as antenna towers or other communication devices, which can forward or broadcast the CMS message to more vehicles that may be outside of the broadcast range of the DSRC antenna 23.

Figure 3:
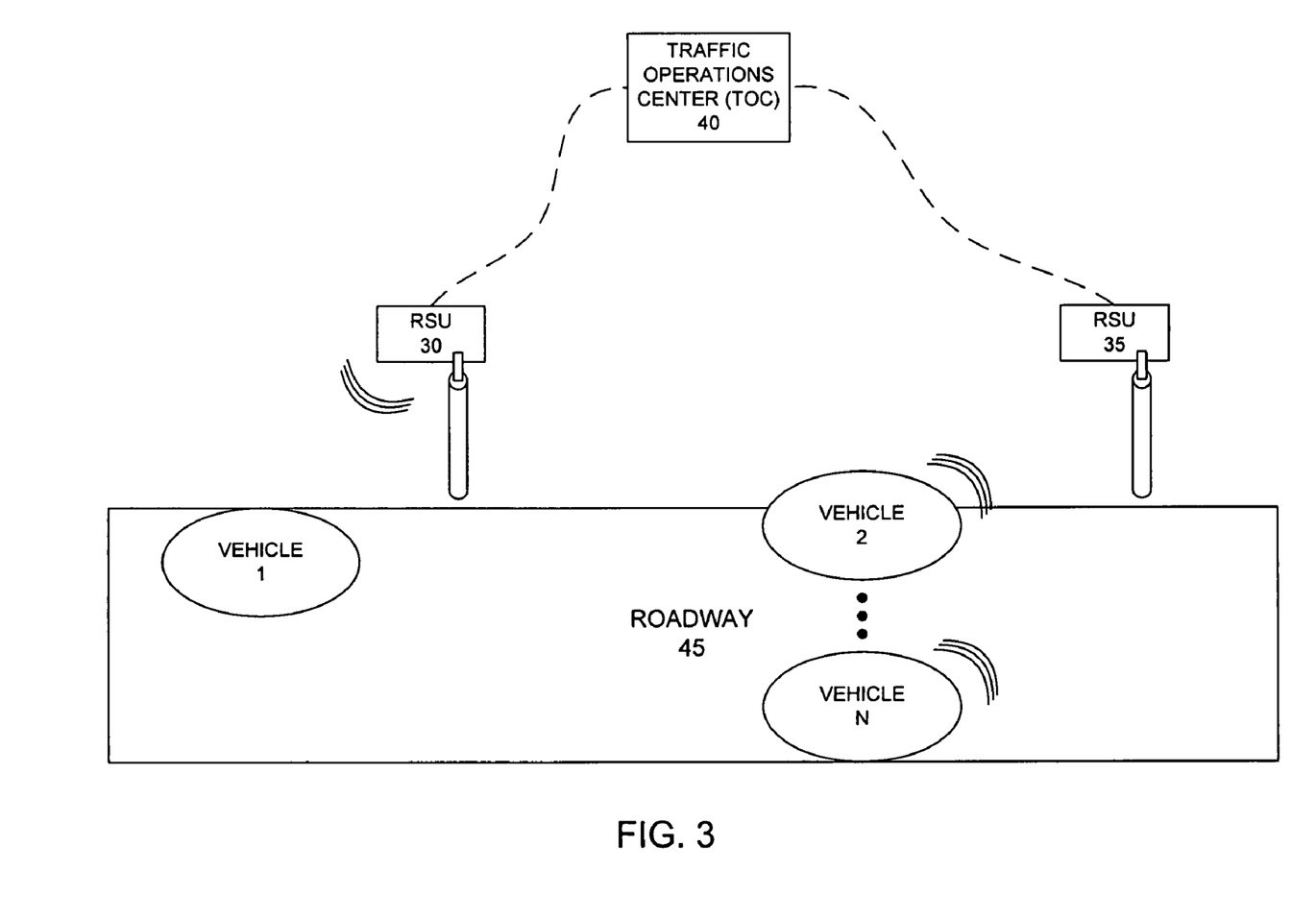
FIG. 3 is a block diagram of an alternative communication arrangement for the traffic control system of FIG. 1.

For example, FIG. 3 shows a block diagram of an alternative communication arrangement for the traffic control system of FIG. 1. As shown in FIG. 3, the vehicle 1 and a plurality of vehicles 2-N are traveling on a roadway 45. Adjacent to the roadway 45 are a series of roadside units (RSUs) 30 and 35. Although only the two RSUs 30 and 35 are shown, it should be understood that there can be many RSUs located adjacent to the roadway 45, such as one for every fixed distance, e.g., one per mile. The RSU 35 is located close to the vehicles 2-N, and the RSU 30 is located close to the vehicle 1. In operation, the RSU 35 receives CMS messages from the vehicles 2-N, and forwards those messages to a traffic control operations center (TOC) 40. The TOC 40 receives the messages, and processes them to determine traffic control information, as will be described in greater detail herein. The TOC 40 may be configured in a manner similar to the DSRC 14 including being configured to determine traffic control information based on location and velocity data received from various vehicles. The TOC 40 then transmits a message to the RSU 30, which forwards the message from the TOC 40 to the vehicle 1. The vehicle 1 is thus able to determine traffic control information based on information from the vehicles 2-N, even if the vehicle 1 is unable to receive messages directly from the vehicles 2-N.

Returning to FIGS. 1 and 2, the vehicles in the broadcast range of the DSRC antenna 23, including the vehicle 1, receive the CMS message from the vehicle 2 (step 206). At vehicle 1, the CMS message is received by the DSRC antenna 13 and provided to the antenna controller 11, which transfers the message to the DSRC processor 14. The message from the vehicle 2 may be received directly from the DSRC antenna 23, via another vehicle, such as a vehicle between the vehicles 1 and 2, or via a receiver/transmitter that can receive messages from vehicles and retransmit them to other vehicles or other receiver/transmitters. The DSRC processor 14 is configured to understand the format and content of the received CMS message and to process it accordingly.

The received CMS message includes an identifier of the vehicle transmitting the CMS message, in this case vehicle 2. The identifier enables the DSRC processor 14 to distinguish which vehicle sent the CMS message and to collect the most up-to-date information about each vehicle transmitting CMS messages to the vehicle 1. The information from the CMS messages can be stored in a memory coupled to or implemented in the DSRC processor 14. When a new CMS message is received, the DSRC processor 14 can update the information stored in the memory or, if it is the first CMS message received from a vehicle, store all of the information in the memory. The information can be stored, for example, in the form of a spreadsheet or table with a line for each vehicle, each line having the identifier of the vehicle and some or all of the information in the CMS message. Accordingly, for each vehicle sending a CMS message to the vehicle 1, the DSRC processor 14 may store each vehicle's location, heading, speed, dimensions and other status settings.

In response to the received CMS message, the DSRC processor 14 determines if the CMS message indicates that the vehicle 2 is traveling on the same road as the vehicle 1 (step 208). To determine if the two vehicles are traveling on the same road, the DSRC processor 14 uses the location information of the vehicle 1 derived from the GPS data received by the GPS antenna 12 and the location information (GPS data and/or data from map database 26) of the vehicle 2 from the received CMS message. The location of each vehicle is used as an input to the map database 16. Based on the location of each vehicle in reference to the map database 16, it is possible to determine if both vehicles are traveling on the same road. In addition to determining if the vehicles are on the same road, the reference to the map database 16 can also be used to determine if the vehicle 2 is ahead of or behind the vehicle 1. Furthermore, if the road has multiple lanes, the location information of the vehicle 2 can preferably be used to determine in which lane the vehicle 2 is traveling, e.g. the left, center, or right lane. To identify the lane, it may be possible to use differential corrections via the RSUs 30, use a more accurate GPS band, or rely on internal map-matching.

Instead of checking if the vehicle 2 is on the same road, a check can be made if the vehicle 2 is traveling on a road of interest. For example, the driver of the vehicle 1, with reference to the map database 16 or other navigational system, may be interested in traffic information on a different roadway than the one on which the vehicle 1 is currently traveling. The driver can select the roadway of interest, and a check is made as to whether the vehicle 2 is traveling on the selected road. In this manner, the driver of the vehicle 1 can get traffic control information for both the current roadway as well as other roadways that the driver may want to use.

If the two vehicles are not on the same road, then the DSRC processor 14 can check if information is already stored for the vehicle 2 and update any new information. If the DSRC processor 14 determines that both vehicles are on the same road, then it checks to determine if the vehicles have the same vector (step 210). The vector corresponds to the heading or direction in which the vehicle is traveling. The CMS message from the vehicle 2 preferably includes the heading or direction in which the vehicle 2 is traveling. In general, even if the vehicle 2 is ahead of the vehicle 1, the traffic related information that can be derived from the vehicle 2 is more relevant if the vehicle 2 is traveling in substantially the same direction as the vehicle 1. In other words, if the vehicle 2 is traveling in a substantially different direction than the vehicle 1, such as in the opposite direction, then any traffic related information derived from the vehicle 2 is not that relevant to the vehicle 1. The vectors of the vehicles 1 and 2 need not be identical or exactly the same. Rather, the vectors can be considered the same or substantially the same if the difference in the vectors is less than some threshold, such as a predetermined number of degrees. The threshold can be a fixed value or can be changed by a driver, dealer, or manufacturer.

If the driver had selected a road of interest other than the road on which the vehicle 1 is traveling, then the driver can also designate the desired heading on the road of interest. If the vehicle 2 is on the road of interest, then instead of determining if the vehicles 1 and 2 are traveling in the same direction, a check is made to determine if the vehicle 2 is traveling in the same direction as the desired heading.

If the vehicles 1 and 2 are not traveling in the same direction, then no action is taken. If they are traveling in the same direction, however, then the DSRC processor 14 calculates an average lane speed (step 212). If the road on which the vehicle 1 is traveling has only one lane or if the received information from the other vehicles cannot be used to distinguish between lanes of a multi-lane road, then the average lane speed simply corresponds to an average road speed. In general, the average lane (or road) speed corresponds to an average speed of vehicles traveling ahead of the vehicle 1. To calculate the average lane speed, the DSRC processor 14 can use the vehicle speeds, the vehicle locations, or a combination of the two. It is also possible to give different weightings to the vehicle speeds depending upon a varying parameter, such as the distance between the vehicle 1 and each vehicle or the type of vehicle. The DSRC processor 14 preferably calculates the average lane speed using the speed of the vehicle 2 and the location of the vehicle 2, as well as the speed and location of other vehicles that are also traveling ahead of the vehicle 1 in the same direction. The location information used to calculate the average lane speed may include its location relative to the vehicle 1 to determine the distance between them and the lane in which it is traveling. The information for the calculation can be derived from the received CMS message transmitted from the vehicle 2. In addition, the average lane speed is preferably calculated by using the information received from the vehicle 2, as well as similar information from other vehicles traveling in the same lane as vehicle 2. In this manner, the average lane speed is calculated in accordance with a speed of each vehicle traveling in the same lane on the same roadway as the vehicle 1 and positioned ahead of vehicle 1. In addition, it is possible to calculate an average lane speed for each lane of the roadway in which the vehicle 1 is traveling.

More preferably, the DSRC processor 14 can use a formula, such as equation (1), to calculate the average lane speed:

$$LS_x = \Sigma(d_i * s_i / d_f) \tag{1}$$

wherein $LS_x$ is the average speed in lane x, x being a lane in which each of the first group of vehicles is traveling, $d_i$ is the distance to a respective one of the first group of vehicles, $s_i$ is the speed of a respective one of the first group of vehicles, and $d_f$ is the sum of the distances from the first vehicle to each of the first group of vehicles. In accordance with equation 1, an average speed of vehicles traveling in a particular lane ahead of the vehicle 1 can be determined. Further, by including the distance to the vehicle 1 as part of the calculation, a weighting is given to each vehicle in accordance with the distance. More particularly, as shown in equation (1), as the distance from the vehicle 1 increases, the weight given to that vehicle's speed in determining the average lane speed also increases. In this manner, the speed of a vehicle farther ahead of the vehicle 1 is given greater weight as its speed is more indicative of the traffic conditions that the vehicle 1 will face.

As communication between vehicles begins more commonplace, such as with DSRC communication, there will be a lag in which initially many if not most vehicles do not communicate with other vehicles. It is likely that specific manufacturers will begin to make the communication a standard feature of each vehicle. In view of this likelihood, the lane speed average can be calculated by giving a preference to vehicles of the same manufacture or some other criteria for giving preference. Such a calculation is shown by equation (2):

$$LS_x = [\Sigma(d_i * s_i/d_{if}) + C_j * (\Sigma(d_j * s_j/d_{jf}))]/(1+C_j) \qquad (2)$$

wherein $LS_x$ is the average speed in lane x, x being the lane in which each of a first group of vehicles is traveling, the first group being non-preferred vehicles, $d_i$ is the distance to a respective one of the first group of vehicles, $s_i$ is the speed of a respective one of the first group of vehicles, $d_{if}$ is the sum of the distances from the first vehicle to each of the first group of vehicles, $C_j$ is a weighting factor for the second group of vehicles, the second group being preferred vehicles, $d_j$ is the distance to a respective one of the second group of vehicles, $s_j$ is the speed of a respective one of the second group of vehicles, and $d_{jf}$ is the sum of the distances from the first vehicle to each of the second group of vehicles.

Returning to FIG. 2, after calculating the average lane speed, the calculated average is compared to a previously calculated average (step 214). The comparison is made to determine if they are sufficiently different. For example, the just-calculated and previously calculated average lane speeds are sufficiently different if the difference between them exceeds a threshold, such as 2 MPH. This threshold can be a fixed value or can be changeable, such as by a driver, manufacturer, or dealer.

If the just-calculated and previously calculated average lane speeds are not different, then it is checked whether an information request has been made (step 216). An information request is a request from the driver of the vehicle 1 for information about the vehicle 1 or based on information received by the vehicle 1, such as traffic control information. To make the request, the driver may make a selection through an interface in the vehicle 1, such as by pressing a button or making a request through an audible command. For example, the vehicle 1 may have an information screen, such as part of its navigation system, that the user can use to make the information request. If no information request has been made, then nothing is done, and the vehicle 1 awaits for another message to be received.

Figure 4:
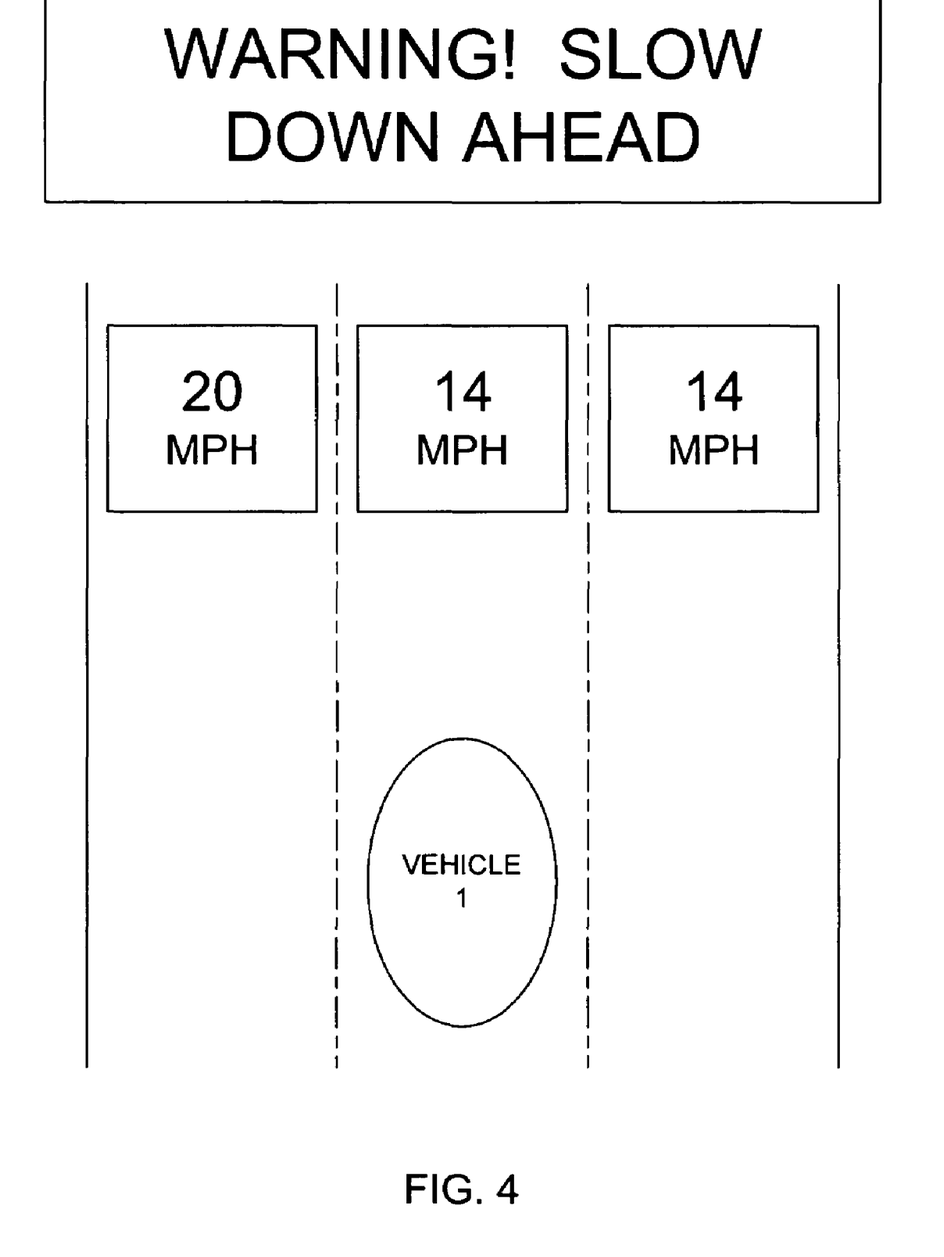
FIG. 4 is a graphical representation of an exemplary display for a vehicle in the traffic control system of FIG. 1

If the information request is made, or if the just-calculated and previously calculated average lane speeds are different, then the average lane speed information is displayed (step 218). The information can be displayed, for example, on an information display panel in the vehicle 1. FIG. 4 is a graphical representation of an exemplary information display panel. As shown in FIG. 4, the average lane speed is displayed to the driver for each of the three lanes of the roadway on which the vehicle 1 is traveling. Instead of an information display panel, the vehicle 1 may have a heads up display (HUD), such as ones used to display current vehicle speed, to show the average lane speed information. The display of the average lane speed information can also be done in response to a change in speed by the vehicle 1 or in response to any drop in the calculated average lane speed.

In accordance with the present invention, a vehicle can receive vehicle speed, location, and heading information from other vehicles traveling on the same roadway. The information can be received via a wireless system, such as a DSRC system or radar. Based on the location information, it can be determined if the vehicle sending the message is ahead of the vehicle receiving the message, positioned on the same roadway, and in the same or different lane. Based on the heading information, it can be determined if the vehicle sending the message is traveling in substantially the same direction. If on the same roadway and traveling in the same direction, the speed of the vehicle transmitting the message can be used to determine an average speed for vehicles on the roadway or even on each lane of the roadway.

By providing the average speed information, the driver can make appropriate driving adjustments. For example, the driver could be alerted that traffic is slowing well before seeing brake-lights and avoid the use of emergency braking. The driver can also use the information to navigate quickly through construction zones or bottlenecks. In addition, if the information indicates a substantial slowing on the roadway, the driver can exit the roadway and avoid potential bumper-to-bumper gridlock. In addition to this utility, the ability to provide this type of speed information to drivers should come at a minimal cost. Vehicles will increasingly have such wireless communication implemented. The only cost will derive from the programming and processing power used to collect, analyze, and average the sensed vehicle speeds.

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiments (which can be practiced separately or in combination) were chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A method for determining a traffic condition of a vehicle, comprising:

receiving status information of a plurality of vehicles, the status information transmitted from the plurality of vehicles including at least a speed;

determining an average speed based on the speed included in the status information of a first group of vehicles among the plurality of vehicles satisfying a first condition; and providing an indication of the determined average speed to a driver of a first vehicle;

wherein the status information is directly transmitted from at least a second vehicle to the first vehicle;

wherein the status information further includes a geographic vehicle location, the method further comprising:

applying a weighting to a respective speed of each of the first group of vehicles in accordance with a geographic vehicle location of each of the first group of vehicles, wherein the average speed is determined in accordance with the respective weighted speed of each of the first group of vehicles.

2. A method according to claim 1, wherein the first condition is that each of the first group of vehicles is positioned in front of the first vehicle and on the same roadway.

3. A method according to claim 1, wherein the first condition is that each of the first group of vehicles is positioned in front of the first vehicle in the same lane of the same roadway.

4. A method according to claim 1, wherein the first condition is that each of the first group of vehicles is moving on the same roadway at a vector that is substantially similar to a vector of the first vehicle.

5. A method according to claim 4, wherein the vector of a respective one of the first group of vehicles is substantially similar to the vector of the first vehicle if a difference between the vectors is less than a predetermined difference.

6. A method for determining a traffic condition of a vehicle, comprising:
receiving status information of a plurality of vehicles, the status information transmitted from the plurality of vehicles including at least a speed;
determining an average speed based on the speed included in the status information of a first group of vehicles among the plurality of vehicles satisfying a first condition;
providing an indication of the determined average speed to a driver of a first vehicle;
wherein the status information further includes a vehicle location of the respective vehicle, the method further comprising:
applying a weighting to a respective speed of each of the first group of vehicles in accordance with a vehicle location of each of the first group of vehicles,
wherein the average speed is determined in accordance with the respective weighted speed of each of the first group of vehicles, and
determining a distance between the first vehicle and each of the first group of vehicles based on the location of the respective vehicle with respect to a location of the first vehicle,
wherein the weighting applied to a respective speed increases as the corresponding determined distance increases.

7. A method for determining a traffic condition of a vehicle, comprising:
receiving status information of a plurality of vehicles, the status information transmitted from the plurality of vehicles including at least a speed;
determining an average speed based on the speed included in the status information of a first group of vehicles among the plurality of vehicles satisfying a first condition; and
providing an indication of the determined average speed to a driver of a first vehicle;
wherein the status information is directly transmitted from at least a second vehicle to the first vehicle;
determining a distance between the first vehicle and each of the first group of vehicles based on the location of the respective vehicle with respect to a location of the first vehicle,
wherein the first condition is that each of the first group of vehicles is in the same lane of the same roadway and positioned in front of the first vehicle, and
wherein the average speed is determined in accordance with the equation:

$$LS_x = \Sigma(d_i * s_i / d_f)$$

wherein $LS_x$ is the average speed in lane x, x being a lane in which each of the first group of vehicles is traveling, $d_1$ is the distance from the first vehicle to a respective one of the first group of vehicles, $s_i$ is the speed of a respective one of the first group of vehicles, and $d_f$ is the sum of the distances from the first vehicle to each of the first group of vehicles.

8. A method for determining a traffic condition of a vehicle, comprising:
receiving status information of a plurality of vehicles, the status information transmitted from the plurality of vehicles including at least a speed;
determining an average speed based on the speed included in the status information of a first group of vehicles among the plurality of vehicles satisfying a first condition; and
providing an indication of the determined average speed to a driver of a first vehicle;
wherein the status information is directly transmitted from at least a second vehicle to the first vehicle;
determining a distance between the first vehicle and each of the first group of vehicles based on the location of the respective vehicle with respect to a location of the first vehicle,
determining a second group of vehicles from the first group of vehicles satisfying a second condition,
wherein the first condition is that each of the first group of vehicles is in the same lane of the same roadway and positioned in front of the first vehicle,
wherein the second condition is that each of the second group of vehicles is a specific type of vehicle, and wherein the average speed is determined in accordance with the equation:

$$LS_x = [\Sigma(d_i * s_i / d_{if}) + C_j * (\Sigma(d_j * s_j / d_{jf}))] / (1 + C_j)$$

wherein $LS_x$ is the average speed in lane x, x being the lane in which each of the first group of vehicles is traveling, $d_i$ is the distance from the first vehicle to a respective one of the first group of vehicles, $s_i$ is the speed of a respective one of the first group of vehicles, $d_{if}$ is the sum of the distances from the first vehicle to each of the first group of vehicles, $C_j$ is a weighting factor for the second group of vehicles, $d_j$ is the distance from the first vehicle to a respective one of the second group of vehicles, sj is the speed of a respective one of the second group of vehicles, and $d_{jf}$ is the sum of the distances from the first vehicle to each of the second group of vehicles.

9. A method according to claim 1, wherein the step of providing further includes displaying the determined average speed to the driver of the first vehicle.

10. A method according to claim 9, wherein the step of determining an average speed further includes determining an average speed of vehicles for each of a plurality of lanes of the roadway on which the first vehicle is traveling, and
wherein the step of displaying further includes showing the determined average speed for each of the plurality of lanes of the roadway.

11. A vehicle configured to determine a traffic condition of a roadway, comprising:
a receiver that receives status information of a plurality of vehicles, the status information transmitted from the plurality of vehicles including at least a speed, wherein the vehicle is a first vehicle, wherein the receiver is configured to receive status information that is directly transmitted from at least a second vehicle to the first vehicle;
a processor;
a memory, coupled to the processor, the memory comprising a plurality of instructions executed by the processor, the plurality of instructions including an instruction to determine an average speed based on the speed included in the status information of a first group of vehicles among the plurality of vehicles satisfying a first condition; and a display that provides an indication of the determined average speed to a driver of the first vehicle;

wherein the status information further includes a geographic vehicle location, the memory further comprising an instruction configured to apply a weighting to a respective speed of each of the first group of vehicles in accordance with a geographic vehicle location of each of the first group of vehicles, wherein the average speed is determined in accordance with the respective weighted speed of each of the first group of vehicles.

12. A vehicle according to claim 11, wherein the first condition is that each of the first group of vehicles is positioned in front of the vehicle and on the same roadway.

13. A vehicle according to claim 11, wherein the first condition is that each of the first group of vehicles is positioned in front of the vehicle in the same lane of the same roadway.

14. A vehicle according to claim 11, wherein the first condition is that each of the first group of vehicles is moving on the same roadway along a vector that is substantially similar to a vector of the vehicle.

15. A vehicle according to claim 14, wherein the vector of a respective one of the first group of vehicles is substantially similar to the vector of the vehicle if a difference between the vectors is less than a predetermined difference.

16. A vehicle configured to determine a traffic condition of a roadway, comprising:

a receiver that receives status information of a plurality of vehicles, the status information transmitted from the plurality of vehicles including at least a speed;

a processor;

a memory, coupled to the processor, the memory comprising a plurality of instructions executed by the processor, the plurality of instructions including an instruction to determine an average speed based on the speed included in the status information of a first group of vehicles among the plurality of vehicles satisfying a first condition; and a display that provides an indication of the determined average speed to a driver of the vehicle, wherein the status information further includes a vehicle location, the memory further comprising an instruction configured to apply a weighting to a respective speed of each of the first group of vehicles in accordance with a vehicle location of each of the first group of vehicles, wherein the average speed is determined in accordance with the respective weighted speed of each of the first group of vehicles, the memory further comprising an instruction configured to determine a distance between the vehicle and each of the first group of vehicles based on the location of the respective vehicle with respect to a location of the vehicle, wherein the weighting applied to a respective speed increases as the corresponding determined distance increases.

17. A vehicle configured to determine a traffic condition of a roadway, comprising, a receiver that receives status information of a plurality of vehicles, the status information transmitted from the plurality of vehicles including at least a speed, wherein the vehicle is a first vehicle, wherein the receiver is configured to receive status information that is directly transmitted from at least a second vehicle to the first vehicle;

a processor;

a memory, coupled to the processor, the memory comprising a plurality of instructions executed by the processor, the plurality of instructions including an instruction to determine an average speed based on the speed included in the status information of a first group of vehicles among the plurality of vehicles satisfying a first condition; and a display that provides an indication of the determined average speed to a driver of the first vehicle;

the memory further comprising an instruction configured to determine a distance between the vehicle and each of the first group of vehicles based on a vehicle location of each of the first group of vehicles with respect to a location of the vehicle, wherein the first condition is that each of the first group of vehicles is in the same lane of the same roadway and positioned in front of the vehicle, and wherein the average speed is determined in accordance with the equation:

$$LS_x = \Sigma(d_i * s_i / d_f)$$

wherein $LS_x$ is the average speed in lane x, x being a lane in which each of the first group of vehicles is traveling, $d_i$ is the distance from the vehicle to a respective one of the first group of vehicles, $s_i$ is the speed of a respective one of the first group of vehicles, and $d_f$ is the sum of the distances from the vehicle to each of the first group of vehicles.

18. A vehicle configured to determine a traffic condition of a roadway, comprising:

a receiver that receives status information of a plurality of vehicles, the status information transmitted from the plurality of vehicles including at least a speed, wherein the vehicle is a first vehicle, wherein the receiver is configured to receive status information that is directly transmitted from at least a second vehicle to the first vehicle;

a processor;

a memory, coupled to the processor, the memory comprising a plurality of instructions executed by the processor, the plurality of instructions including an instruction to determine an average speed based on the speed included in the status information of a first group of vehicles among the plurality of vehicles satisfying a first condition; and a display that provides an indication of the determined average speed to a driver of the first vehicle;

the memory further comprising instructions configured to:

determine a distance between the vehicle and each of the first group of vehicles based on the location of the respective vehicle with respect to a location of the vehicle; and determine a second group of vehicles from the first group of vehicles satisfying a second condition, wherein the first condition is that each of the first group of vehicles is in the same lane of the same roadway and positioned in front of the vehicle, wherein the second condition is that each of the second group of vehicles is a specific type of vehicle, and wherein the average speed is determined in accordance with the equation:

$$LS_x = [\Sigma(d_i * s_i / d_{if}) + C_j * (\Sigma(d_j * s_j / d_{jf}))] / (1 + C_j)$$

wherein LS$_x$ is the average speed in lane x, x being the lane in which each of the first group of vehicles is traveling, d$_i$ is the distance from the vehicle to a respective one of the first group of vehicles, s$_i$ is the speed of a respective one of the first group of vehicles, d$_{if}$ is the sum of the distances from the vehicle to each of the first group of vehicles, C$_j$ is a weighting factor for the second group of vehicles, d$_j$ is the distance from the vehicle to a respective one of the second group of vehicles, s$_j$ is the speed of a respective one of the second group of vehicles, and d$_{jf}$ is the sum of the distances from the vehicle to each of the second group of vehicles.

19. A vehicle according to claim 11, the memory further comprising an instruction configured to display the determined average speed to the driver of the vehicle.

20. A vehicle according to claim 11, wherein the memory further comprises instructions configured to:
    determine an average speed of vehicles for each of a plurality of lanes of the roadway on which the vehicle is traveling; and
    display the determined average speed for each of the plurality of lanes of the roadway to the driver of the vehicle.

21. A method for determining a traffic condition of a vehicle, comprising:
    receiving status information of a plurality of vehicles, the status information transmitted from the plurality of vehicles including at least a speed;
    determining an average speed based on the speed included in the status information of a first group of vehicles among the plurality of vehicles satisfying a first condition; and
    providing an indication of the determined average speed to a driver of a first vehicle;
    wherein the status information is directly transmitted from at least a second vehicle the first vehicle;
    wherein the status information further includes a geographic vehicle location, the method further comprising:
    applying a weighting to a respective speed of each of the first group of vehicles in accordance with a geographic vehicle location of each of the first group of vehicles,
    wherein the average speed is determined in accordance with the respective weighted speed of each of the first group of vehicles;
    determining a distance between the first vehicle and each of the first group of vehicles based on the vehicle location of each of the first group of vehicles with respect to a location of the first vehicle,
    wherein the weighting applied to a respective speed increases as the corresponding determined distance increases.

22. A vehicle configured to determine a traffic condition of a roadway, comprising:
    a receiver that receives status information of a plurality of vehicles, the status information transmitted from the plurality of vehicles including at least a speed, wherein the vehicle is a first vehicle, wherein the receiver is configured to receive status information that is directly transmitted from at least a second vehicle to the first vehicle;
    a processor;
    a memory, coupled to the processor, the memory comprising a plurality of instructions executed by the processor, the plurality of instructions including an instruction to determine an average speed based on the speed included in the status information of a first group of vehicles among the plurality of vehicles satisfying a first condition; and
    a display that provides an indication of the determined average speed to a driver of the first vehicle;
    wherein the status information further includes a vehicle location, the memory further comprising an instruction configured to apply a weighting to a respective speed of each of the first group of vehicles in accordance with a vehicle location of each of the first group of vehicles,
    wherein the average speed is determined in accordance with the respective weighted speed of each of the first group of vehicles,
    the memory further comprising an instruction configured to determine a distance between the vehicle and each of the first group of vehicles based on the vehicle location of each of the first group of vehicles with respect to a location of the vehicle,
    wherein the weighting applied to a respective speed increases as the corresponding determined distance increases.

23. A method for determining a traffic condition of a vehicle, comprising:
    receiving status information of a plurality of vehicles, the status information transmitted from the plurality of vehicles including at least a speed;
    determining an average speed based on the speed included in the status information of a first group of vehicles among the plurality of vehicles satisfying a first condition; and
    providing an indication of the determined average speed to a driver of a first vehicle;
    wherein the status information further includes a geographic vehicle location, the method further comprising:
    applying a weighting to a respective speed of each of the first group of vehicles in accordance with a geographic vehicle location of each of the first group of vehicles,
    wherein the average speed is determined in accordance with the respective weighted speed of each of the first group of vehicles.

24. A method according to claim 1, wherein the status information has been previously transmitted from at least a third vehicle.

25. A vehicle according to claim 11, wherein the receiver is configured to receive status information that has been previously transmitted from at least a third vehicle.

26. A method according to claim 1,
    wherein the step of determining the average speed is performed by the first vehicle.

27. A method according to claim 26, wherein the first vehicle determines the traffic condition as the status information is received by the first vehicle.

28. A vehicle according to claim 11, wherein the vehicle is configured to determine the traffic condition as the status information is received by the first vehicle.

29. A method according to claim 1, wherein the status information includes vehicle status information that is generated by each of the plurality of vehicles,
    wherein the vehicle status information is specific to each of the plurality of vehicles.

30. A vehicle according to claim 11, wherein the receiver is configured to receive status information that includes vehicle status information that is generated by each of the plurality of vehicles,
    wherein the vehicle status information is specific to each of the plurality of vehicles.

31. A method according to claim 1, wherein the status information is transmitted from the first vehicle to a road side unit, wherein the status information is transmitted from the road side unit to a traffic operation center, wherein the status information is transmitted from the traffic operation center to the road side unit or another road side unit, wherein the status information is transmitted from the road side unit or the another road side unit to a receiving vehicle, wherein the step of determining the average speed is performed by the receiving vehicle.

32. A method according to claim 1, wherein the status information is transmitted from the first vehicle to a road side unit, wherein the status information is transmitted from the road side unit to a traffic operation center, wherein the step of determining the average speed is performed by the traffic operation center, wherein the status information is transmitted from the traffic operation center to the road side unit or another road side unit, wherein the status information is transmitted from the road side unit or the another road side unit to a receiving vehicle.

33. A vehicle according to claim 11, wherein the receiver is configured to receive status information that has been transmitted from the first vehicle to a road side unit, from the road side unit to a traffic operation center, from the traffic operation center to the road side unit or another road side unit, and from the road side unit or the another road side unit to a receiving vehicle.

34. A vehicle according to claim 33, wherein status information includes the average vehicle speed, which has been determined by the traffic operation center.

35. A vehicle according to claim 11,
wherein the processor and the memory of the first vehicle are configured to determine the average vehicle speed.

36. A method according to claim 29, wherein the first vehicle generates vehicle status information that is specific to the first vehicle, wherein the first vehicle transmits status information including the vehicle status information generated by the first vehicle and vehicle status information generated by the plurality of vehicles.

37. A vehicle according to claim 30, wherein the memory further comprises an instruction to generate vehicle status information for the first vehicle, wherein the memory comprises an instruction to transmit status information including the vehicle status information generated by the first vehicle and vehicle status information generated by the plurality of vehicles.

* * * * *